US005609496A

United States Patent [19]
Kilmer et al.

[11] Patent Number: 5,609,496
[45] Date of Patent: Mar. 11, 1997

[54] AIR-TIGHT CONNECTOR ASSEMBLY

[75] Inventors: Dan L. Kilmer, Chatsworth; Rick L. Freeman, Camarillo, both of Calif.

[73] Assignee: Micropolis Pte Ltd., Chatsworth, Calif.

[21] Appl. No.: 340,141

[22] Filed: Nov. 15, 1994

[51] Int. Cl.⁶ .................................................. H01R 13/52
[52] U.S. Cl. ........................ 439/271; 439/276; 439/936; 439/371
[58] Field of Search ............................... 439/67, 77, 271, 439/276, 371, 936, 935

[56] References Cited

U.S. PATENT DOCUMENTS

| 3,721,943 | 3/1973 | Curr | 439/935 |
|---|---|---|---|
| 3,998,515 | 12/1976 | Panek | 439/935 |
| 4,666,228 | 5/1987 | Wood | 339/94 |
| 4,676,575 | 6/1987 | Denlinger et al. | 439/271 |
| 4,729,743 | 3/1988 | Farrar et al. | 439/276 |
| 4,923,406 | 5/1990 | Bucknam | 439/77 |
| 4,948,378 | 8/1990 | Hoshino | 439/271 |
| 4,960,391 | 12/1990 | Beinhaur et al. | 439/559 |
| 5,041,015 | 8/1991 | Travis | 439/492 |
| 5,083,933 | 1/1992 | Colleran et al. | 439/271 |
| 5,257,941 | 11/1993 | Lwee et al. | 439/65 |
| 5,276,577 | 1/1994 | Brooks et al. | 439/67 |
| 5,306,160 | 4/1994 | Roberts | 439/77 |
| 5,329,427 | 7/1994 | Hogdahl | 439/165 |
| 5,348,488 | 9/1994 | Green et al. | 439/140 |
| 5,357,386 | 10/1994 | Haidari et al. | 439/67 |

*Primary Examiner*—P. Austin Bradley
*Assistant Examiner*—Jill Demello
*Attorney, Agent, or Firm*—Poms, Smith, Lande & Rose Professional Corporation

[57] ABSTRACT

A connector assembly for use with a sealed housing, such as a hard disk drive housing, including a bulkhead adapted to cooperate with a connector slot, the bulkhead supporting a plurality of electrical connection pins, a flex circuit including electrical leads operably connected to respective electrical connection pins and a layer of pressure sensitive adhesive formed substantially between the flex circuit and the bulkhead. The present invention may also include a seal which rests substantially between a base portion of the bulkhead and the outer surface of the housing to prevent contaminants from entering the housing through the bulkhead/slot interface.

15 Claims, 2 Drawing Sheets

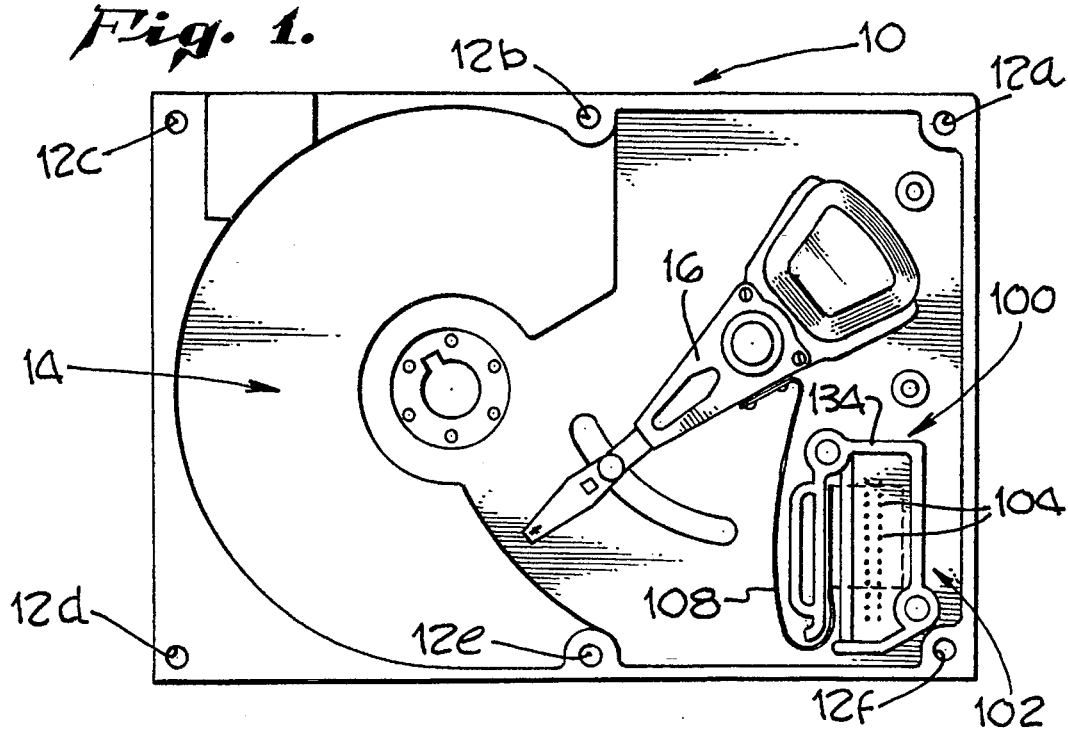
Fig. 1.
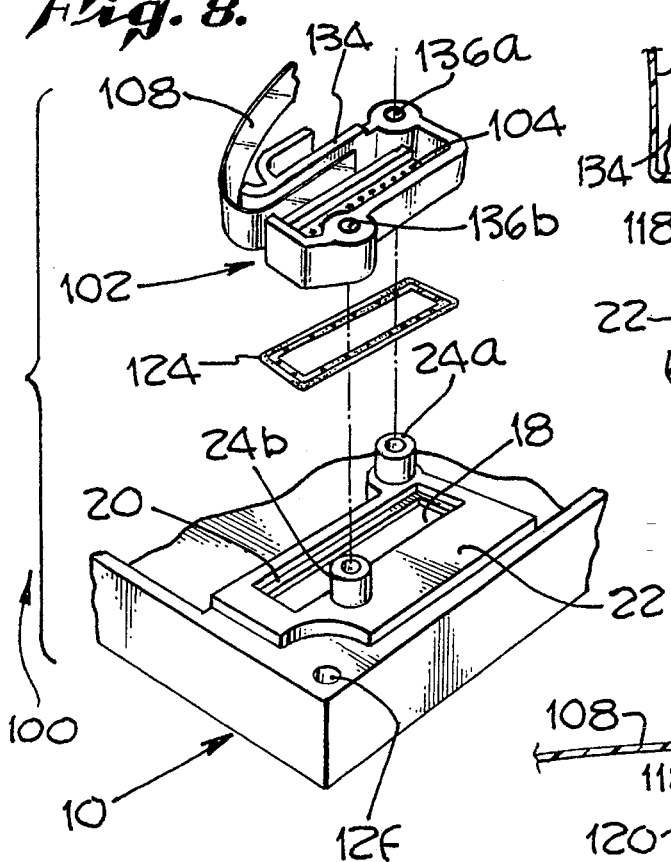
Fig. 8.
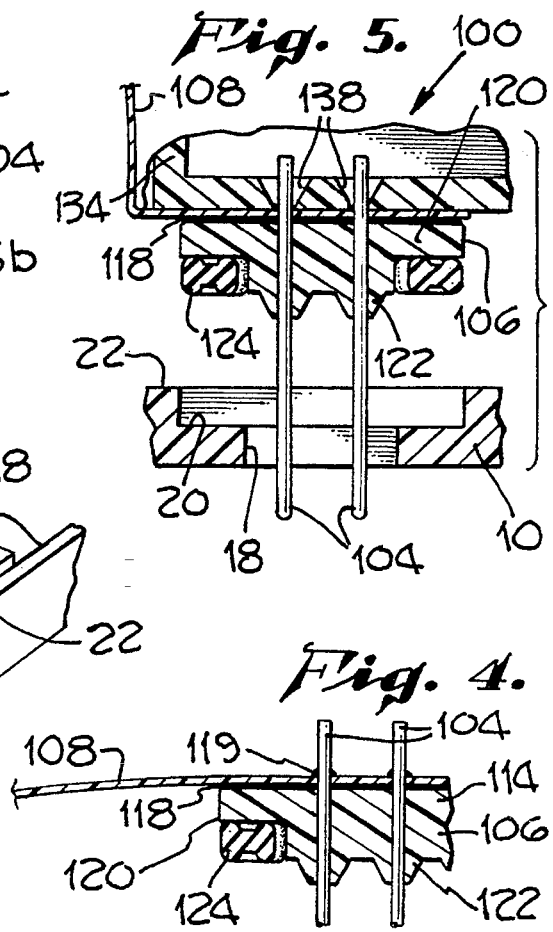
Fig. 5.
Fig. 4.

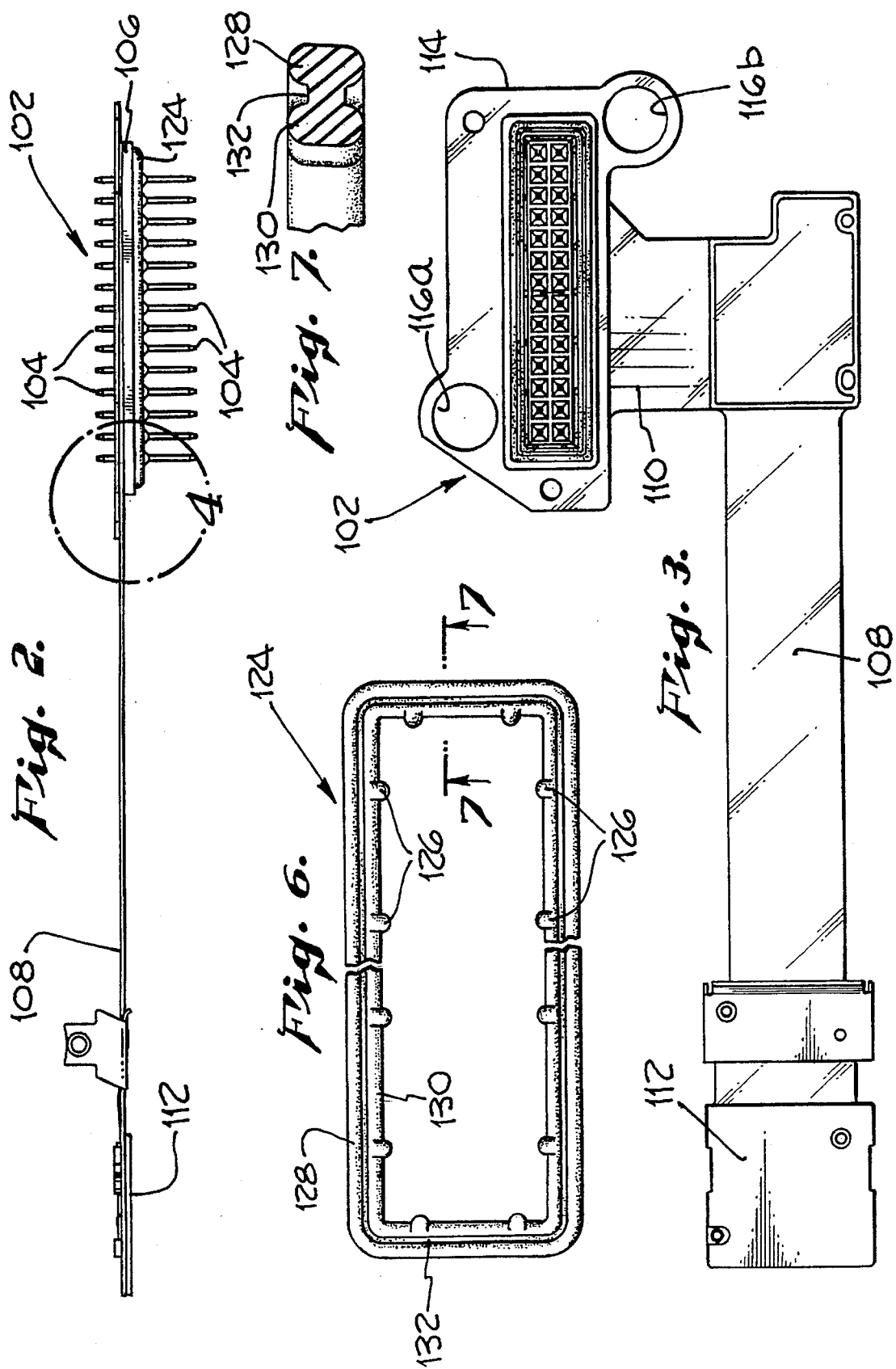

AIR-TIGHT CONNECTOR ASSEMBLY

BACKGROUND OF THE INVENTION

1. Field of Invention

The present invention relates generally to the sealing of contaminant-free housings, such as hard disk drive assembly housings and, more particularly, to the hermetic or near-hermetic sealing of input/output connectors used with contaminant-free housings.

2. Description of the Related Art

In order to insure a long service life for sensitive components, such as those contained in a hard disk drive, housings are often hermetically or near-hermetically sealed. Such sealing is generally effective in preventing the entry of contaminants into the assembly housing. However, hard disk drives and other sensitive components are often part of systems and, accordingly, must be electrically connected to other components within the system. The structure necessary to provide the electrical connection is often the source of contaminants.

Hard disk drives and other sensitive components are normally connected to the other components in a system through the use of a flex cable which includes a plurality of input/output leads that are electrically isolated from one another within a substantially flat, plastic cable. The electrical leads typically terminate on the pins of a bulkhead connector. The bulkhead connector is inserted into a connector slot provided on the housing, protrudes outside of the housing, and provides electrical access for connection to other components. Contaminants pass through the flex cable and bulkhead connector arrangement in two ways. First, inadequate sealing between the bulkhead connector and the connector slot often allows contaminants to enter the otherwise sealed housing. Second, the bulkhead connector includes bores through which power and signal pins extend to the flex cable. Contaminants can pass through the bores into the housing.

A number of solutions have been proposed in regards the problem of housing contamination associated with electrical connectors. For example, connectors meeting military specifications employ a glass bead seal between the pins and the bulkhead connector. While the glass bead seal effectively prevents contamination via the bulkhead bores, it obviously will not prevent ingress of contaminants caused by poor sealing between the bulkhead connector and connector slot. The glass bead seal is also prohibitively expensive for civilian use.

Another attempt to solve the aforementioned problem in the art involves the manual application of a sealing compound (normally Loctite™) to each power or signal pin in the bulkhead connector. This solution, however, is labor intensive, costly, and subject to sealing failure. Inadequate sealing with respect to a single pin in the bulkhead connector can cause a sealing failure. Moreover, this proposed solution fails to address the problem of inadequate sealing between the bulkhead connector and connector slot.

A third method of sealing bulkhead connector pins, which involves injection molding various types of plastic material around the pins during the molding of the bulkhead, has also failed to solve the aforementioned problems in the art. Tests have shown that air-tight pin sealing is not achieved using this method.

There have been a number of attempts to provide adequate sealing between the connector and connector slot. For example, U.S. Pat. No. 5,257,941, issued to Lwee et al., discloses a U-shaped electrical connector employed between the sealed environment of a hard disk drive housing and external electrical components. Referring to FIGS. 6, 7 and 8 of the '941 patent, a rectangular aperture is provided at one end of a hard disk drive housing. The aperture is dimensioned to allow registration and insertion of one end of a rigid, U-shaped electrical connector. The other end of the U-shaped connector is inserted into a circuit board connector. Once inserted, the top portion of the connector is flush with the external surface of the housing. Sealant is then applied to a portion of the connector in order to seal any gaps between the connector and the housing. Because the U-shaped connector is rigid, it is useless in those instances where the disk drive housing and the circuit board connector are slightly misaligned relative to one another. Also, the application of sealant during the final assembly process adds time and expense to the assembly process and renders disassembly very difficult in the event the connector requires replacement.

U.S. Pat. No. 5,276,577, issued to Brooks et al., discloses a relatively simple, but labor intensive method of sealing a hard disk drive assembly housing. As illustrated in FIGS. 4a–c of the '577 patent, a base and cover assembly form a contaminant free environment. A flat cable from within the drive assembly extends outwardly from within the sealed environment and mates with a connector outside of the enclosure. A piece of double sided adhesive is adhered to the cover. The cable is folded against the adhesive. Metal foil sealing tape is then applied over the cable and the gap between the base and cover. Clearly, this multi-step process is also labor intensive and costly. Furthermore, experience has shown that this type of seal frequently leaks air at the two ends of the flex cable. Such leaks necessitate repair work that often results in flex cable damage due to the permanent nature of the sealing materials employed.

OBJECT AND SUMMARY OF THE INVENTION

The general object of the present invention is to provide an improved connector assembly which obviates, for practical purposes, the aforementioned problems in the art. In particular, one object of the present invention is to provide an apparatus for connecting a flexible cable to a hard disk drive, or other sealed device, which effectively prevents contaminants from entering the hermetically sealed housing.

Another object of the present invention is to provide a sealed connector assembly which is relatively inexpensive to manufacture and install.

A further object of the present invention is to provide a connector assembly that forms a hermetic, or near-hermetic seal upon insertion into a connector slot, without application of permanent, non-removable sealing materials.

In order to accomplish these and other objectives, the present connector includes a bulkhead adapted to cooperate with a connector slot, the bulkhead supporting a plurality of electrical connection pins, a flex circuit including electrical leads operably connected to respective electrical connection pins, and a layer of pressure sensitive adhesive formed substantially between the flex circuit and the bulkhead. This configuration provides a number of advantages over the prior art. For example, the layer of pressure sensitive adhesive effectively seals any gaps between the pins and the bores through which they extend. Moreover, the application of a layer of pressure sensitive adhesive between the bulkhead and flex circuit is far less costly than the application of a glass bead seal or other sealing compound to each and every pin in the bulkhead. As such, the present invention prevents contaminants from passing through the pin bores in a bulkhead connector in a manner which is more cost effective than that previously known in the art.

In accordance with another aspect of the present invention, the electrical connection pins may be connected to the electrical leads of the flex circuit through the use of solder beads applied to the side of the flex circuit opposite the pressure sensitive adhesive. The solder provides additional pin sealing.

In accordance with still another aspect of the present invention, a flexible seal may be provided which rests substantially between a base portion of the bulkhead and the housing. The seal prevents contaminants from entering the housing through the bulkhead/slot interface. Moreover, the seal can be easily manufactured and combined with the bulkhead. As such, use of the seal is not as labor intensive or costly as the aforementioned prior art methods of providing similar sealing capabilities. Furthermore, use of the flexible seal allows for easy disassembly and reassembly in the event repair is necessary.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiment of the invention will be made with reference to the accompanying drawings.

FIG. 1 is a top view of a disk drive housing base plate.

FIG. 2 is a side elevation view of a connector assembly in accordance with a preferred embodiment of the present invention.

FIG. 3 is a plan view of the connector assembly illustrated in FIG. 1.

FIG. 4 is an enlarged view of a portion of the connector assembly illustrated in FIG. 2.

FIG. 5 is a section view showing the insertion of the connector assembly into a slot.

FIG. 6 is a plan view of a seal in accordance with a preferred embodiment of the present invention.

FIG. 7 is a section view taken along line 7—7 in FIG. 6.

FIG. 8 is a perspective view showing the mounting of a connector assembly on a base plate.

DETAILED DESCRIPTION OF THE PREFERRED EMBODIMENTS

The following is a detailed description of a preferred embodiment of the invention. This description is not to be taken in a limiting sense, but is made merely for the purpose of illustrating the general principles of the invention. In particular, although reference is made herein to hard disk drives, the present invention is not limited to use with such devices. Rather, the present invention may be employed in any device which requires electrical connection to components within a sealed housing. The scope of the invention is defined by the appended claims.

FIG. 1 shows one example of a hard disk drive base plate 10 which may used in conjunction with the present invention. A housing cover (not shown) may be secured to the base through the use apertures 12a–12f, thereby forming a hermetic, or near hermetic environment. As known to those of skill in the art, disk drives include at least one storage disk located in the area indicated by reference numeral 14 and at least one read/write head positioning arm 16. The read/write heads may be connected to components outside the housing through the use of a connector assembly generally indicated by reference numeral 100.

As illustrated for example in FIGS. 2–4, connector assembly 100 may include a connector body 102, having a plurality of power and signal pins 104 supported by a bulkhead 106, and a relatively thin flex circuit 108. The bulkhead includes apertures through which the pins pass. Flex circuit 108 includes a plurality of electrical leads 110 (only a few of which are shown) which are respectively connected to pins 104. Pins 104 may be connected to electrical leads 110 through the use of a solder bead or other means known to those of skill in the art. Flex circuit 108 may be formed from plastic or other flexible material which isolates the electrical leads from one another. One end of flex circuit 108 includes a flat connector 112. The other end includes a head portion 114 which, as best seen in FIG. 3, has a larger surface area than that of bulkhead 106. Head portion 114 includes a number of apertures 116a and 116b which may be used for fastening connector assembly 100 to the housing.

Turning to the exemplary embodiment illustrated in FIGS. 4 and 5, a layer of pressure sensitive adhesive 118 is formed between bulkhead 106 and head portion 114 of the flex circuit. The pressure sensitive adhesive forms a seal around pins 104. Solder beads 119 form electrical connections between pins 104 and flex circuit leads 110 (leads shown in FIG. 3). The seal and solder prevent air and other contaminants from entering the sealed housing through the bulkhead pin apertures. The preferred bulkhead 106 includes a base portion 120 and a smaller raised portion 122. Raised portion 122 may be inserted into a connector slot 18 formed in base plate 10 so that pins 104 can make electrical connections outside the sealed housing.

As also illustrated for example in FIGS. 4 and 5, the present invention may include a seal 124 which is positioned between bulkhead base portion 120 and a ledge 20 adjacent slot 18 when bulkhead raised portion 122 is inserted through slot 18. Seal 124 prevents contaminants from entering housing through the bulkhead/slot interface.

A preferred embodiment of seal 124, a quasi-o-ring type rubber seal, is illustrated in FIGS. 6 and 7. As best seen in FIG. 6, seal 124 is substantially rectangular in shape and includes a plurality of positioning tabs 126 which engage raised portion 122 of bulkhead 106. Turning to the cross-section shown in FIG. 7, seal 124 includes a pair of ring portions 128 and 130 which are connected by a mid-portion 132. In the preferred embodiment, ring portions 128 and 130 surround the raised portion 122 of the bulkhead.

In the illustrated embodiment, a mounting bracket 134 is used to force bulkhead 106 and seal 124 against ledge 20 of slot 18. Flex circuit head portion 114 rests on a surface 22 of base plate 10. Mounting bracket 134 includes apertures 136a and 136b. A fastener, such as a screw, may be passed through apertures 136a and 136b (as well as through apertures 116a and 116b) and into apertures 24a and 24b formed in the base plate. Finally, a series of holes 138 allow the top portions of pins 104 to pass through the mounting bracket.

Although the present invention has been described in terms of the preferred embodiment above, numerous modifications and/or additions to the above-described preferred embodiments would be readily apparent to one skilled in the art. For example, although the preferred seal is a quasi-o-ring type rubber seal, the present invention is susceptible to use with seals of different shapes and materials. A seal having either a rectangular or a circular cross-section may be employed. Additionally, the seal may be formed from elastomeric materials such as poly-urethane instead of rubber. Further, pressure sensitive adhesive may be used in place of the seal, thereby eliminating the need for the mounting bracket. It is intended that the scope of the present invention extends to all such modifications and/or additions and that the scope of the present invention is limited solely by the claims set forth below.

We claim:

1. A connector for use with a sealed disk drive housing having an inner surface and a connector slot associated with the inner surface, the connector comprising:

a bulkhead including a base portion, defining first and second sides, and a raised portion on the first side of the base portion, the raised portion being adapted to be inserted into the connector slot, the bulkhead further defining a plurality of apertures extending from the first side through the raised portion and base portion to the second side;

a plurality of electrical connection pins extending through the apertures;

a flex circuit defining a first side and a second side and including a plurality of electrical leads which are soldered to respective pins on the first side of the flex circuit, the flex circuit being substantially adjacent the second side of the bulkhead base portion such that a space is defined therebetween;

a continuous layer of pressure sensitive adhesive formed in the space between the second side of the base portion of the bulkhead and the second side of the flex circuit and around respective portions of the pins located in the space such that a cross-section of the connector defines a layered structure including the bulkhead and flex circuit with the adhesive and respective portions of the pins therebetween; and a rubber seal adjacent the raised portion of the bulkhead, the rubber seal resting substantially between the first side of the base portion of the bulkhead and a ledge formed adjacent to the inner surface of the connector slot when the raised portion of the bulkhead is inserted into the connector slot.

2. A connector as claimed in claim 1, wherein the rubber seal comprises first and second ring portions connected by a mid-portion.

3. A connector as claimed in claim 1, wherein the rubber seal comprises a plurality of positioning tabs.

4. A connector for use with a connector slot, comprising:

a bulkhead adapted to cooperate with the connector slot, the bulkhead defining a first side and a second side and supporting a plurality of electrical connection pins which respectively extend through the bulkhead from the first side to the second side;

a flex circuit including electrical leads operably connected to respective electrical connection pins, the flex circuit and the second side of the bulkhead defining a space substantially therebetween; and a continuous layer of pressure sensitive adhesive formed in the space substantially between the flex circuit and the second side of the bulkhead and around respective portions of the pins located in the space, such that a cross section of the connector defines a layered structure including the bulkhead and flex circuit with the adhesive and respective portions of the pins therebetween.

5. A connector as claimed in claim 4, wherein the bulkhead defines a plurality of apertures through which the electrical connection pins extend, a gap is defined between at least one of the pins and a corresponding aperture and the layer of pressure sensitive adhesive seals the gap.

6. A connector as claimed in claim 4, wherein the electrical leads are connected to the electrical connection pins by solder beads.

7. A connector as claimed in claim 4, wherein the connector slot is formed in a housing defining an inner surface and the bulkhead comprises a raised portion adapted to be inserted into the connector slot and a base portion extending substantially perpendicularly to the inner surface of the housing.

8. A connector as claimed in claim 7, further comprising a seal adapted to rest substantially between the base portion of the bulkhead and a ledge formed adjacent to the inner surface of the housing.

9. A connector as claimed in claim 8, wherein the seal comprises a rubber quasi-o-ring seal.

10. A connector as claimed in claim 8, wherein the seal comprises a plurality of positioning tabs.

11. A connector as claimed in claim 8, wherein the seal comprises first and second ring portions connected by a mid-portion.

12. A connector for use with a housing having an inner surface and a connector slot formed in the inner surface, the connector comprising:

a bulkhead including a base portion and a raised portion adapted to be inserted into the connector slot, the bulkhead supporting a plurality of electrical connection pins which extend through the raised portion;

a flex circuit including electrical leads overlying and connected to respective electrical connection pins; and a seal substantially between the base portion of the bulkhead and the outer surface of the housing, the seal having an aperture defining an inner perimeter and a plurality of positioning tabs, the positioning tabs extending inwardly from the inner perimeter and engaging the raised portion of the bulkhead.

13. A connector as claimed in claim 12, wherein the seal comprises a rubber quasi-o-ring seal.

14. A connector as claimed in claim 12, wherein the seal comprises first and second ring portions connected by a mid-portion.

15. A connector as claimed in claim 14, wherein a cross-section of at least one of the first and second ring portions defines a substantially rectangular shape having rounded corners.

* * * * *